(12) United States Patent
Liang

(10) Patent No.: US 7,257,112 B2
(45) Date of Patent: Aug. 14, 2007

(54) RECEIVER DIRECTED POWER MANAGEMENT FOR WLAN RECEIVER

(75) Inventor: Jie Liang, Plano, TX (US)

(73) Assignee: Texas Instruments Incorporated, Dallas, TX (US)

( * ) Notice: Subject to any disclaimer, the term of this patent is extended or adjusted under 35 U.S.C. 154(b) by 614 days.

(21) Appl. No.: 10/724,494

(22) Filed: Nov. 28, 2003

(65) Prior Publication Data
US 2005/0128987 A1   Jun. 16, 2005

(51) Int. Cl.
  *H04L 12/66* (2006.01)
  *H04B 1/38* (2006.01)
(52) U.S. Cl. ............ 370/352; 370/338; 370/474; 455/161.1; 455/574; 455/343.2
(58) Field of Classification Search ............ 455/234.1, 455/257, 67.11, 75, 154.1, 515, 161.1, 161.2, 455/572, 573, 574, 234.2, 343.2, 343.4; 370/352, 370/389, 474, 338, 331
See application file for complete search history.

(56) References Cited

U.S. PATENT DOCUMENTS

| | | | | |
|---|---|---|---|---|
| 6,366,622 | B1 * | 4/2002 | Brown et al. ............... | 375/322 |
| 2005/0097376 | A1 * | 5/2005 | Weinberger et al. ........ | 713/320 |
| 2005/0128988 | A1 * | 6/2005 | Simpson et al. ............ | 370/338 |
| 2006/0062200 | A1 * | 3/2006 | Wang et al. ................ | 370/352 |

\* cited by examiner

*Primary Examiner*—Edward F. Urban
*Assistant Examiner*—John J. Lee
(74) *Attorney, Agent, or Firm*—Steven A. Shaw; W. James Brady; Frederick J. Telecky, Jr.

(57) ABSTRACT

A method of conserving power in a WLAN receiver is provided wherein processing tasks that need only to be operated for a brief period of time during the reception of a received packet are enabled only during the brief period of time. The enabling includes providing multiple power control signals that are controlled by a state machine for enabling and disabling the processing tasks.

6 Claims, 2 Drawing Sheets

RECEIVER DIRECTED POWER MANAGEMENT FOR WLAN RECEIVER

CROSS-REFERENCE TO RELATED APPLICATIONS

This application is related to co-pending application of Jie Liang filed on Nov. 28, 2003, U.S. patent application Ser. No. 10/724,376 entitled "METHOD AND SYSTEM FOR PROVIDING LOW POWER WLAN RECEIVER." This application is incorporated herein by reference.

1. Field of Invention

This invention relates to Wireless Local Area Network (WLAN) receiver and more particularly to reducing the power usage in WLAN receivers.

2. Background of Invention

Wireless Local Area Networks (WLANs) are becoming very popular today whereby the transceiver may be small and the user no longer needs to be tied to an Ethernet cable. It is also probable that the communications device such as a wireless transceiver be a mobile battery powered device. The transceiver may be in the form of a lap top computer or a cell phone.

Because the transceiver is often used without connection to a power source through a power cord, the transceiver is therefore subject to battery drain that limits its use away from a power source. Extending the time period between battery charges is of key importance to continued communications. Various subsystems of a battery powered device may place heavier demands upon battery resources than others. When the battery powered device employs a wireless transceiver to transmit and receive data, the transceiver typically consumes significant quantities of battery power which impacts battery life.

In order to increase the overall battery life of such transceivers, power management schemes have been utilized where the communications device enters a sleep mode where only the basic device functions such as system clock, timers, interrupts, etc. are operational. In this mode the device can neither transmit nor receive information and therefore can not perform any communication activities.

It is desirable to provide a power management system that does not impair the communications capability. Power consumption has become a major performance factor for the WLAN chipset. An important task of the IEEE 802.11a/g standard is the power consumption.

SUMMARY OF INVENTION

In accordance with one embodiment of the present invention a method of conserving power in a WLAN receiver includes the steps of determining processing tasks that are operated only for a brief period in a packet and enabling said processing tasks during said brief period and disabling the processing thereafter until the next packet.

In accordance with an embodiment of the present invention a system for conserving power in a WLAN receiver includes a plurality of modules for performing processing tasks that occupy only a brief period for the receiver during each packet; a clock with multiple clock zones for the processing tasks; a state machine for determining the state of signal processing of a received packet; and the clock coupled to the modules and responsive to the state of the state machine for disabling the modules when processing is complete for each packet.

DESCRIPTION OF PREFERRED EMBODIMENT

Figure 1:
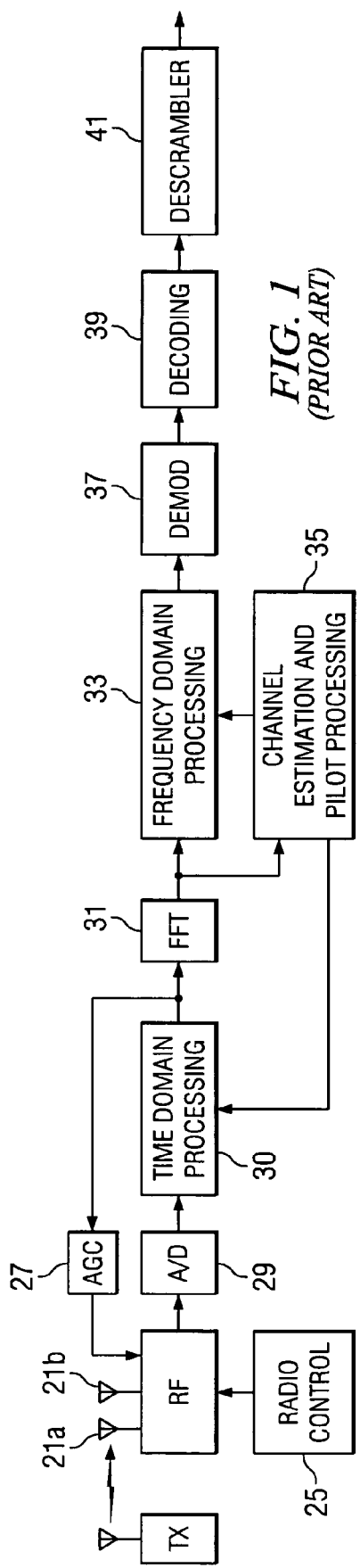
FIG. 1 is a block diagram of part of a WLAN receiver.

FIG. 1 illustrates a typical WLAN network includes a transmitter TX transmitting signals over a wireless channel to a receiver RX. The transmitter TX sends the information in bursts or packets.

A typical receiver Rx receives RF signal through a diversity antenna system 21 and processes the RF signal through an RF stage 23 including radio control setting 25, automatic gain control (AGC) 27 and signal diversity selection takes place. The gain control and diversity control are made at the beginning. The receiver usually has two antennas 21a and 21b and the one with the strongest signal or signal to noise ratio is selected.

The output from the RF stage is down converted using a free running local oscillator. The receiver local oscillator is free running and therefore there is usually an offset frequency from that of the transmitter local oscillator. Here is where a timing estimation and correction is done. The output from the down converter is sampled and converted to digital at an analog to digital converter (A/D) 29 and passes to a Fast Fourier Transform module (FFT) 31 via time domain processing 30. The output from the FFT 31 is processed for channel compensation due to wireless channel fading, timing errors, and frequency offset at frequency domain processing 33. The FFT samples are also used as input to channel estimation and pilot processing module 35. The output from the channel compensator and pilot processing module 35 is applied to frequency domain processing 33 and time domain processing 30. The output from the frequency domain processing 33 is demodulated through demodulation stage 37 and then is decoded at decoding 39, descrambled at descrambler 41 and applied to the MAC interface to the user.

Figure 2:
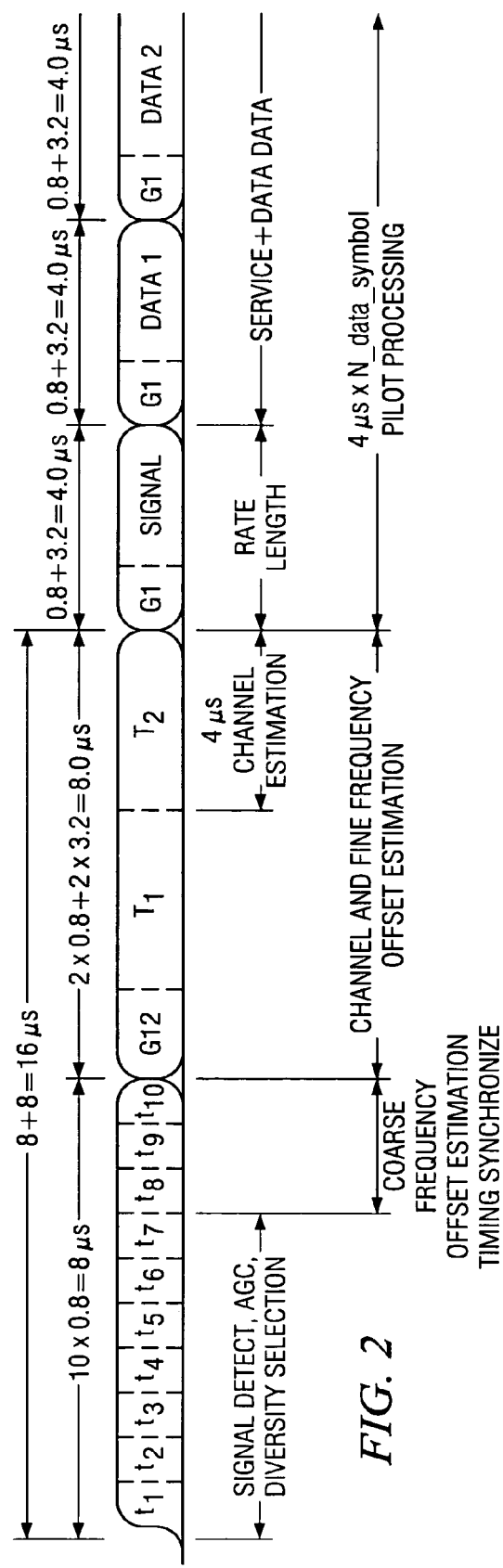
FIG. 2 illustrates the ODFM processing duty cycle.

Each packet starts with 8 microseconds of short preambles followed by an 8 microsecond long preamble followed with data symbols such as symbols 1, 2, 3 etc. FIG. 2 illustrates the Orthogonal Frequency Division Multiplexing (OFDM) processing duty cycle. The first eight microseconds (t1-t8) includes the identifier at times t1-t10 during which signal detection, radio control setting, automatic gain control (AGC) and signal diversity selection takes place. During times t8 through t10 coarse frequency estimations are done for timing synchronization. The boundary of the packet is selected. There is a circuit that does a correlation to determine the type of packet as compared to other signals. It determines that it is the start of a standard 802.11 type packet as compared to other signals. At times T1 and T2 channel and fine frequency offset estimation is done.

The channel estimation is a long sequence estimation of 4 microseconds. The data symbols follow the preamble. The channel is subject to distortions such as from multi-path echo signals. The preamble contains data signals for channel estimation that are sent over the channel to the receiver RX. These data signals are known at the receiver RX. The receiver RX compares the pattern of the received data signals from the channel to the known data signals and determines an estimate of the channel distortions (Hg). The receiver then has an equalizer at the receiver front end that applies an inverted value of the detected channel distortion (1/Hg) to substantially equalize or remove the distortions based on the channel estimate.

Also, because the channel may change during the packet a second type of equalization used is that of pilot processing where in the data symbols to follow the preamble pilot tones are inserted in each symbol for comparing to known tones to measure the error. The system then tracks the channel changes by tracking this pilot to get an offset estimation.

Figure 3:
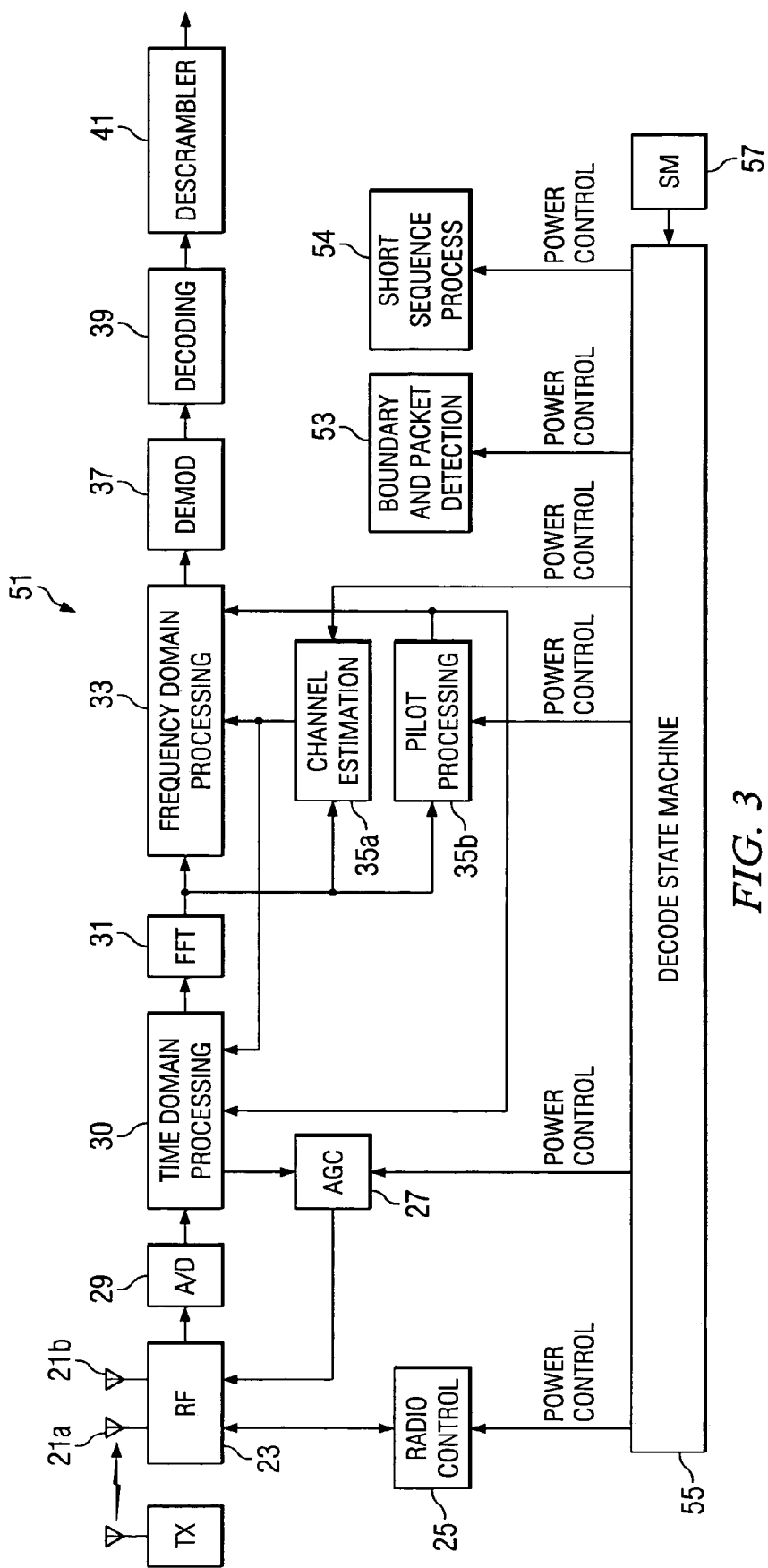
FIG. 3 illustrates the WLAN receiver according to one embodiment of the present invention.

In accordance with the present invention the AGC module 27, boundary and packet detection module 53, the short sequence processing module 54, the channel estimation module and the radio control 25 module of receiver 51 are disabled by clock signal generator or decode state machine 55 based on the state of the receiver state machine 57. See FIG. 3. FIG. 3 uses the same callouts for the same elements found in FIG. 1. The elements that are now controlled in FIG. 3 are modified to be controllable. When these detection and correction are finished the power to these modules can be saved through clock gating or gating the input data signals by the decode state machine 55.

To accomplish this more clock zones may be added to the previous clock tree and these are controlled using the receiver states as determined by the local receiver state machine. The radio control setting (RSSI/CCA portion) 25 is gated off after the preamble. The receiver automatic gain control (AGC) 27 is gated off after AGC settles. The receiver short sequence processing 54 is gated off after short sequence processing. The receiver channel estimation/long sequence processing 35a is shut down after long sequence processing. The boundary and packet detection 53 is gated off after that step is completed for each packet.

The channel estimation needs to be done only once for every packet and the value can be stored in a register and used for the duration of the packet. The pilot processing is active throughout the whole time following the preamble portion.

In accordance with embodiments of the invention a lot of power saving is achieved if a simpler module 35b is used exclusively for pilot processing after the preamble and a separate channel estimator 35a is operated only during the preamble of each packet. This control is provided by the decode state machine 55 identifying when the preamble is finished. The decode state machine 55 is responsive to the state of the receiver state machine and controls the power control signals to enable and disable these functions after use. A more detailed description of channel estimation and pilot processing is described in co-pending application of Jie Liang filed on Nov. 28, 2003, U.S. patent application Ser. No. 10/724 entitled "METHOD AND SYSTEM FOR PROVIDING LOW POWER WLAN RECEIVER." This application is incorporated herein by reference.

It is estimated that by doing all of the power control described above in the receiver 51 the current power usage would change from 187 mw to 106 mw.

Although the invention has been described with reference to specific embodiments, the description is intended to be illustrative of the invention and is not intended to be limiting. Various modifications and applications may occur to those skilled in the art without departing from the true spirit and scope of the invention as defined in the appended claims.

The invention claimed is:

1. A method of conserving power in a WLAN receiver comprising:
   determining packet processing tasks that need only to be operated for a brief period of time during the reception of a received packet wherein said packet processing tasks include automatic gain control, radio control setting and frequency offset processing;
   enabling said packet processing tasks only during said brief period of time of said received packet; and
   disabling said packet processing tasks after each has completed its processing task for each packet.

2. The method of claim 1 wherein said enabling includes providing multiple control signals for enabling and disabling said processing tasks controlled by a state machine that determines the state of the receiver.

3. The method of claim 1 wherein said packet processing tasks includes channel estimation and said channel estimation is disabled after the preamble of each packet.

4. A system for conserving power in a WLAN receiver comprising:
   a plurality of modules includes automatic gain control, radio control setting and frequency offset processing for performing processing tasks that occupy only a brief period for the receiver for each packet, wherein said packet processing tasks include automatic gain control, radio control setting and frequency offset processing;
   a clock with multiple clock zones for the multiple tasks;
   a state machine for determining the state of signal processing of a received packet;
   said clock coupled to said modules and responsive to the state of the state machine for disabling said modules when processing is complete for each packet.

5. The system of claim 4 wherein said plurality of modules includes a modules used exclusively for pilot processing after the preamble.

6. The system of claim 4 wherein said plurality of modules further includes a channel estimator operated only during the preamble of each packet.

* * * * *